Feb. 15, 1966   W. H. PAGENKOPF   3,235,055
KEYBOARD FOR GENERATING BRAILLE COPY
Filed April 30, 1964   2 Sheets-Sheet 1

INVENTOR
WALTER H. PAGENKOPF
BY R. C. Terry
ATTORNEY

Feb. 15, 1966  W. H. PAGENKOPF  3,235,055
KEYBOARD FOR GENERATING BRAILLE COPY
Filed April 30, 1964 — 2 Sheets-Sheet 2

FIG. 2

| TWO-CELL CONTRACTIONS ||||||||||||
| INITIAL LETTER |||| INITIAL LETTER |||| FINAL LETTER ||||
| CONTR. | 5 | 45 | 456 | CONTR. | 5 | 45 | 456 | CONTR. | 46 | 56 | 6 |
|---|---|---|---|---|---|---|---|---|---|---|---|
| CANNOT | | | C | RIGHT | R | | | ALLY | | | Y |
| CHARACTER | CH | | | SOME | S | | | ANCE | E | | |
| DAY | D | | | SPIRIT | | | S | ACTION | | | N |
| EVER | E | | | THEIR | | | THE | ENCE | | E | |
| FATHER | F | | | THERE | THE | | | FUL | | L | |
| HAD | | | H | THESE | | THE | | ITY | | Y | |
| HERE | H | | | THOSE | | TH | | LESS | S | | |
| KNOW | K | | | THROUGH | TH | | | MENT | | T | |
| LORD | L | | | TIME | T | | | NESS | | S | |
| MANY | | | M | UNDER | U | | | ONG | | G | |
| MOTHER | M | | | UPON | | U | | OUND | D | | |
| NAME | N | | | WHERE | WH | | | OUNT | T | | |
| ONE | O | | | WHOSE | | WH | | SION | N | | |
| OUGHT | OU | | | WORD | | W | | TION | | N | |
| PART | P | | | WORK | W | | | | | | |
| QUESTION | Q | | | WORLD | | | W | | | | |
| | | | | YOUNG | Y | | | | | | |

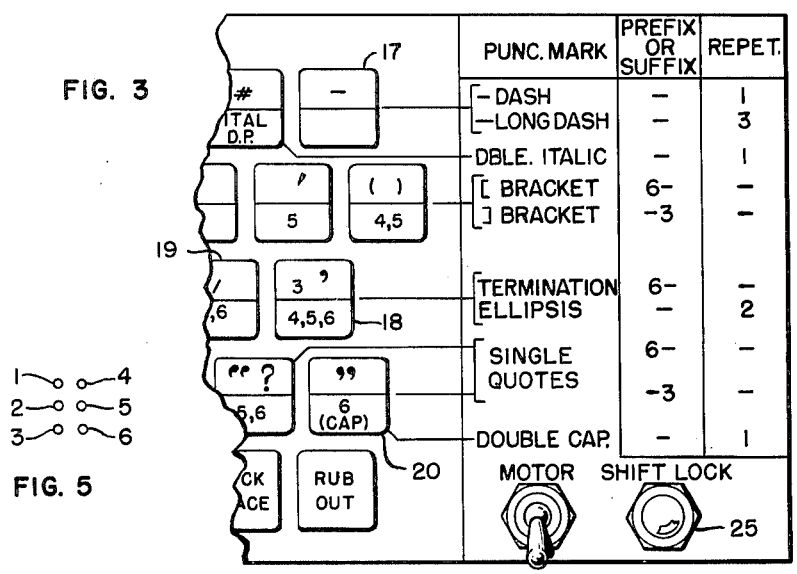

| PUNC. MARK | PREFIX OR SUFFIX | REPET. |
|---|---|---|
| ⌈ DASH | — | 1 |
| ⌊ LONG DASH | — | 3 |
| DBLE. ITALIC | — | 1 |
| ⌈ BRACKET | 6- | — |
| ⌊ BRACKET | -3 | — |
| ⌈ TERMINATION | 6- | — |
| ⌊ ELLIPSIS | — | 2 |
| ⌈ SINGLE QUOTES | 6- | — |
| ⌊ | -3 | — |
| DOUBLE CAP. | — | 1 |

United States Patent Office 3,235,055
Patented Feb. 15, 1966

3,235,055
KEYBOARD FOR GENERATING BRAILLE COPY
Walter H. Pagenkopf, Indianapolis, Ind., assignor to Teletype Corporation, Skokie, Ill., a corporation of Delaware
Filed Apr. 30, 1964, Ser. No. 363,712
5 Claims. (Cl. 197—100)

This invention relates to a keyboard for generating Braille copy and more particularly to a keyboard which has displayed on its keytops representations of all of the one-cell contractions which are found in the Braille language.

In the terminology of Braille, contraction means a word or group of letters which may be represented by one Braille cell.

Braille copy is generated by two basic types of machines, the first of which is known as a Braille writer. Operation of this first machine requires a complete knowledge of Braille because the machine has but six operating keys, one corresponding to each of the six intelligence bearing elements of the Braille character or cell. When an operator desires to generate an alphabetic or numeric character in the Braille language he must obtain, either from his memory or from a chart, the Braille equivalent of the character and then depress the keys of the Braille writer which correspond to the Braille equivalent. It is thus apparent that operation of the Braille writer requires a highly skilled operator.

The second type of machine which is used to generate Braille copy is designed to overcome the necessity of employing a highly skilled operator. These machines employ a keyboard similar to a typewriter keyboard and transmit signals from the keyboard in code to a Braille writer for transcription into Braille copy. In the alternative those machines may control a tape perforator in the manner described in United States Reissue Patent No. 20,330 granted to S. Morton on April 13, 1937, thereby permanently recording the message in punched paper tape. The paper tape may then be read by a tape reader in the manner described in United States Patent No. 2,468,462, granted to W. T. Rea on April 26, 1949, and the output of the tape reader may be transmitted to a Braille writer for transcription into Braille copy. The keyboards used on these machines in the past have not displayed all of the symbols found in the Braille language and have therefore required operators who posses a rather extensive knowledge of Braille. The type of knowledge of Braille required is not the same as the type of knowledge required to operate the Braille writer because the operator need not know the Braille symbol for the character he wishes to generate. The operator must, however, know all the one-cell Braille contractions and must know how to produce them with the particular keyboard he is using.

Accordingly, it is an object of this invention to simplify the generation of Braille copy.

It is a further object of this invention to render it possible for an operator having a bare minimum of knowledge of Braille to generate Braille copy.

A still further object of this invention is to provide a keyboard for generating Braille copy on which are displayed all the one-cell contractions found in the Braille language.

Another object of this invention is to provide a keyboard on which the one-cell contractions of the Braille language are arranged logically and systematically in a manner whereby a person skilled in the operation of an ordinary typewriter may quickly and easily learn to generate Braille copy.

Still another object of this invention is to provide a keyboard for the generation of Braille copy on which the letters, numerals, and punctuation signs are displayed in substantially the same positions they occupy on the keyboard of an ordinary typewriter.

In accordance with the preferred embodiment of the invention there is provided a keyboard for generating Braille copy. The keyboard has displayed on its keytops all of the one-cell contractions of the Braille language and in addition has the majority of its keytops arranged in a manner which is quite similar to the arrangement of the keytops of an ordinary typewriter. In the present arrangement, not only the alphabetical characters, i.e., letters, are arranged in the manner of an ordinary typewriter, but also the numerical symbol, i.e., numbers, and the punctuation signs are located in approximately the same positions as the location of identical symbols on an ordinary typewriter.

Because of the pecularities in Braille copy it is necessary that any keyboard for generating Braille copy display a plurality of symbols which have no meaning in standard written text. The keytops bearing these symbols are conveniently grouped on the keyboard of the present invention and when employed in conjunction with charts which are provided at opposite sides of the keyboard, they make possible the generation of not only all of the one-cell contractions of Braille language but also all of the two-cell contractions and all of the special punctuation signs.

A more thorough and complete understanding of the details of the keyboard for generating Braille copy may be had by reference to the accompanying drawings in which:

FIGS. 2 and 3 are charts which are normally displayed on the left and on the right of the keyboard, respectively, and which when viewed in conjunction with the keytop layout of FIG. 1, comprise a complete showing of the keyboard of the present invention;

FIG. 5 is a representation of a Braille cell.

Figure 1:
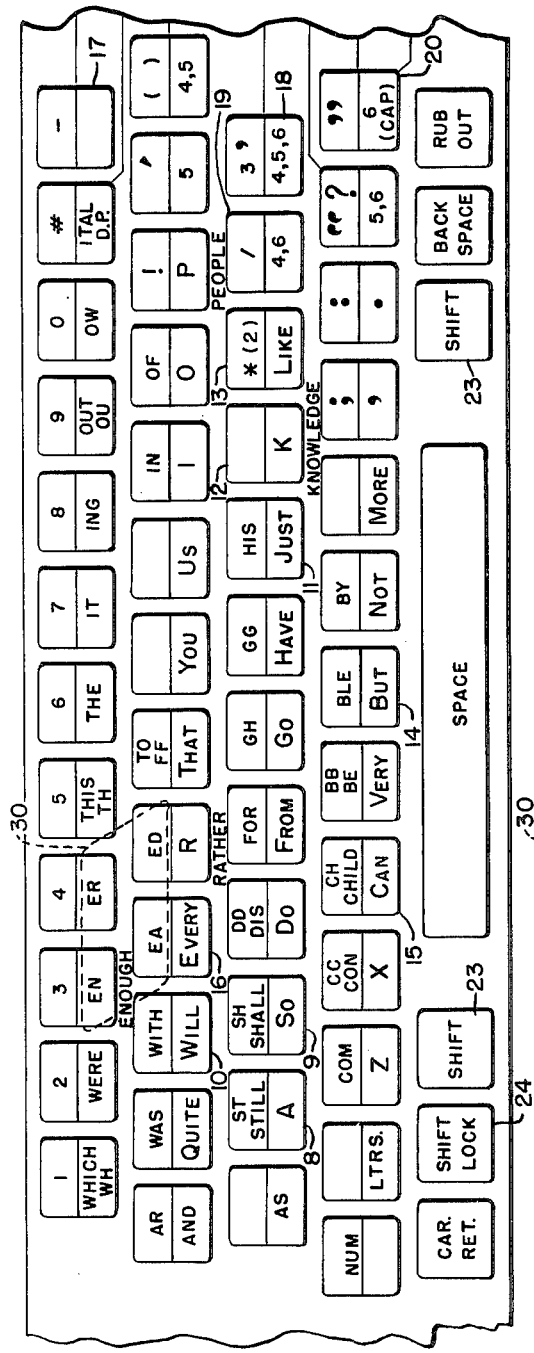
FIG. 1 is a layout of the arrangement of keytops of the keyboard for generating Braille copy.

As illustrated in FIG. 5 Braille cells are made up of permutational combinations of six dots or projections arranged in two rows of three dots each. These projections are raised out of the paper by embossment, so that they may be sensed by the fingers of a blind person when he is reading the Braille copy. The dots or projections of the Braille cell, as shown in FIG. 5, are numbered 1 through 6 and intelligence is conveyed by the presence or absence of a dot in each position; that is, various combinations of the dots represent intelligence. For instance, the letter "a" is represented in Braille by a dot in the 1 position of a cell and by the absence of dots in the remaining positions of the cell. The letter "m" is indicated by the presence of dots in the 1, 3, and 4 positions and by the absence of dots in the remaining positions.

Numbers are indicated in the Braille language by using the same code combinations or configurattion of dots as are used for the first ten letters of the alphabet. That is, the number "1" has dots in exactly the same positions as the letter "a." However, preceding a number or a group of numbers there must be presented, to the reader, an indication that the significance of the following cell or cells is not alphabetic. This is done by presenting a Braille cell which contains the number sign, which has dots in the 3, 4, 5, and 6 positions. Upon sensing this sign the person reading the Braille copy will then read a cell which contains the combination of dots for the letter "a" as the number "1." In order to revert to alphabetics after a number of a group of numbers has been written, the letters sign, which has dots in the 5 and 6 positions, must be presented so that the person who is reading the Braille copy will again read the next cell as alphabetic rather than numeric.

When it is desired to indicate a capital letter, the capital sign, which has a dot in the 6 position only, is presented and the person reads the letter following the capital sign as a capital rather than as a lower case letter.

Braille cells are combined to form intelligible copy in one of two languages. The first of these languages is known as Grade I Braille and it is written by placing the appropriate cells in order, letter for letter, in much the same way that plain written text is printed on a page. The principal difference between plain printed text and Grade I Braille is, as previously stated, that in Braille appropriate signs must be used when the blind reader is to recognize various cells as numbers instead of as letters and when various letters are to be read as capitals.

The other language for Braille copy is known as Grade II Braille and it differs from Grade I Braille in that various shorthand methods are used to cut down on the number of Braille cells needed to generate a given message. Principal among these shorthand methods is the use of one-cell contractions which differ from an ordinary Braille character in that more than one letter is conveyed to the blind person in a single cell. For instance, almost all of the regular character cells of the Braille language convey a whole word in addition to conveying the characters with which they are normally associated. For example, the cells for the letter "n," which has dots in the 1, 3, 4, and 5 positions, also represents the word "not." A blind person, upon reading the cell which nor-normally represents the letter "n," will read the word "not" if the cell is both preceded and followed by a space or blank cell. However, if the cell which represents the letter "n" is either preceded by or followed by or both preceded and followed by other intelligence bearing cells the blind person reading the cell will read it as the letter "n." One-cell contractions are also used in the Grade II Braille to represent groups of letters which are not whole words. For instance, the letters "ble" may be written in a one-cell contraction which has the dots in 3, 4, 5, and 6 positions. Some of the cells of this type may also be used to convey whole words. For example, a cell which has dots in the 1 and 6 positions normally represents to the blind reader the letters "ch." However, if this cell is both preceded and followed by a space or blank cell the blind reader will read the cell as the word "child."

Another shorthand method employed in Grade II Braille is carried forward in what are known as two-cell contractions. Two-cell contractions are written by using what is known as a special character in conjunction with a cell that represents a character. For instance, to write the word "day" a special character, which has a dot in the 5 position only, is written and this character is followed by a cell which has dots in the 1, 4, and 5 positions which, it should be noted, as the cells for the letter "d." The blind person upon sensing the special character and the cell containing the letter "d" will read this combination as the word "day." It should be understood that all of the special characters are made up of combinations of dots which do not by themselves have any letter or one-cell contraction significance. The special characters convey intelligence only when used in conjunction with intelligence bearing cells to form a two-cell contraction.

The final shorthand method used in Grade II Braille is the short form word. These are combinations of two or more intelligence bearing cells which when taken together form an abbreviation for a whole word. For instance, the word "according" is represented by the short form word "ac" and the word "conceiving" is represented by the short form word "concvg" which in Grade II Braille consists of the cell representing the one-cell contracting "con" followed by the cells representing the individual letters "c," "v" and "g." The short form words follow a logical pattern and are very easy to learn. For instance, the word "conceive" is represented by "concv" and the word "deceive" is represented by the short form "dcv"; thus, there is a pattern to the short form words. The syllable "ceive" is always represented by the letters "cv," the suffix "ing" is always represented by the letter "g." Grade II Braille has 76 such short form words all of which are used quite often and all of which follow a pattern such as the one outlined above.

A more complete understanding of the Braille cell and of the various shorthand methods used in Grade II Braille may be had by referring to a work entitled, "English Braille;" American Edition, 1959, which is published by the American Printing House for the Blind, Louisville, Kentucky. It should be understood that the various idioms of the Braille language which are disclosed in the above-identified work are made part of this specification as if fully disclosed herein and that no attempt has been made in the present invention to alter or vary the Braille language in any manner whatsoever.

Figure 4:
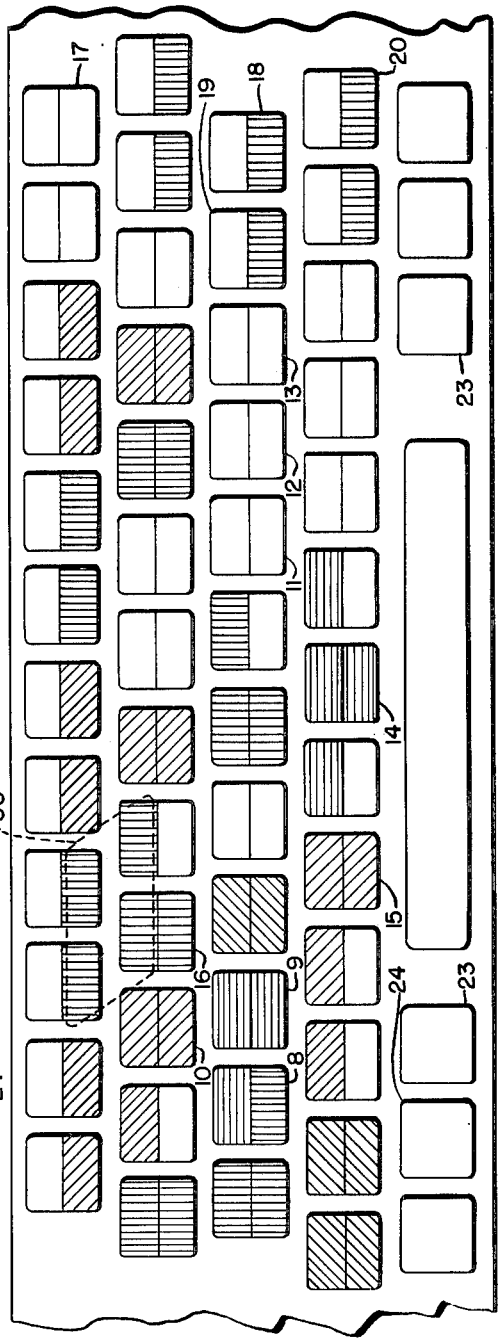
FIG. 4 shows a color coding arrangement for the keyboard layout of FIG. 1.

In FIG. 1, when taken in conjunction with the color coding scheme of FIG. 4, there is shown a keyboard for generating both Grade I and Grade II Braille. On the keyboard there are displayed a plurality of keytops the majority of which are grouped in exactly the same manner as the grouping of keytops on an ordinary typewriter. It should be understood that the symbol which are represented on the keytops are separated into two groups known as upper and lower case. In accordance with the practice of ordinary typewriter keyboards the shift key 23 must be depressed and must be either held in its depressed position or locked therein to generate the characters which are represented on the upper halves of all keytops. For instance, the keytop 11 will generate the Braille cell representing the letter "j" when it is in its unshift or lower case mode, however, when this keytop is depressed while the shift key 23 is depressed, it will generate the one-cell contraction for the word "his." A shift lock lamp 25 has been provided to indicate the fact that the shift key has been locked in its depressed condition. That is, whenever the shift lock key 24 is depressed the shift lock lamp 25 will be illuminated and will remain so until the keyboard is unshifted or returned to its lower case condition, this being accomplished by depressing the shift key.

As has been stated above, all keys of the present keyboard which are capable of controlling the generation of single alphabetic characters are arranged in exactly the same manner as the keys of a standard typewriter. For instance, the "j" key 11, the "k" key 12, and the key 13 for lower case "L" are arranged with respect to each other and with respect to the remaining keys of the keyboard precisely as they are arranged on a standard typewriter keyboard. It should be noted that all three of these keys are capable of generating one-cell contractions in addition to generating single characters. This is indicated on key 11 where the lower half of the keytop bears the alphabetic character "j" followed by the group of letters "ust" on a slightly smaller scale than the letter "j." If the key 11 is depressed when the apparatus is in its lower case or unshifted mode and when the cell which is generated for the key is either preceded by or followed by or both preceded and followed by another intelligence bearing cell, the person reading the cell thus generated will read the letter "j." However, if the key 11 is depressed when the apparatus is in its lower case mode and if the cell thus generated is neither preceded nor followed lowed by an intelligence bearing character, the person reading the cell will read the word "just." As may be seen by reference to FIG. 1, all the keys which generate cells representing alphabetic characters have displayed on their surfaces the character and in addition to this practically all the keys have displayed either on or directly below their surfaces groups of letters which when read in conjunction with the character form a word. All keys of this type are capable of generating a Braille cell representing, in addition to the character, the one-cell contraction formed from the character and the group of letters. This is accomplished in the manner outlined above in conjunction with the "j" key 11.

The keyboard of the present invention also has displayed on its keytops all the one-cell contractions which are not generated by a single character key. For instance, the "b" key 14 is capable of generating in its lower case mode a cell representing either the word "but" or the letter "b" in the manner outlined in conjunction with the "j" key 11. However, when the "b" key 14 is depressed after the apparatus has been placed in upper case or shift mode, key 14 generates a different cell representing the one-cell contraction "ble." It should be noted that the one-cell contraction "ble" is different from the one-cell contraction for the word "but" in that it never represents, to a blind person reading the copy, the single letter "b" but instead conveys the letters "ble" regardless of what precedes or follows it. The "c" key 15, in the lower case or unshifted mode, generates either the letter "c" or the word "can" in the manner outlined above. In the upper case or shifted mode, the key generates the letters "ch" if the cell is either preceded by or followed by or both preceded and followed by other intelligence bearing cells. When the cell generated by the key in the upper case mode is neither preceded by nor followed by other intelligence bearing cells, it is read as the word "child." However, like the "b" key 14, the cell generated by the "c" key 15 in its upper case mode never conveys a single letter to a blind reader.

In accordance with the present invention the one-cell contractions which are not generated by keys that also generate single characters, are arranged on the keyboard in a logical and orderly manner. For instance, the one-cell contractions for the letters "ea," "ed," "en," and "er," which are enclosed in the dotted line 30, are all grouped closely adjacent to one another and are also group closely adjacent to the "e" key 16. This is done to enable an operator who is skilled in the operations of a standard typewriter quickly and easily to locate all the one-cell contractions which start with a given letter. Since all the single letter keys are arranged in exactly the same manner as they are on an ordinary typewriter, the operator of the present keyboard, who is skilled in the use of an ordinary typewriter, will direct his attention to the familiar position of the single character key which is used to generate the letter that is the beginning letter of the one-cell contraction. For instance, if the operator desires to generate the one-cell contraction "er" his attention would naturally flow to the "e" key 16. Since all the one-cell contractions which begin with the letter "e," that is, all the one-cell contractions within the dotted line 30, are grouped closely adjacent to the "e" key, his attention would thereby not only be directed to the little "e" key 16 but also to all the one-cell contractions which begin with the letter "e."

This feature of the present invention is aided by the color coding arrangement which is shown in FIG. 4. The vertical, horizontal and oblique cross-hatchings represent colors in conformity with the color chart on page 117 of the Rules of Practice of the United States Patent Office. Thus, the horizontal cross-hatching indicates a blue keytop, vertical cross-hatching indicates a red keytop, cross-hatching which slants from the upper left-hand corner to the lower right-hand corner indicates a green keytop and cross-hatching which slants from the upper right-hand to the lower left-hand corner indicates a brown keytop. Keytops on which there is no cross-hatching should be taken as being white. It should be understood that all keytops bear the symbols shown in FIG. 1; these symbols being shown against the background which is shown in FIG. 4. As shown in FIG. 4, not only does the "e" key 16 have a red background, but also all of the keytops which generate one-cell contractions beginning with the letter "e" have a red background. Thus, the operator can quickly differentiate the keys bearing one-cell contractions which begin with the letter "e" from the remaining nearby keytops because the keytops located in the general area of those bearing one-cell contractions beginning with the letter "e" are of a different color. When an operator who is skilled in the operation of a standard typewriter desires to generate a one-cell contraction beginning with the letter "e" his attention will naturally be directed to the "e" key 16, and since all the keytops which bear one-cell contractions beginning with "e" are the same color as the "e" key 16 his eye will be directed to these keytops by their color and he will quickly be able to locate the desired one-cell contraction. The color coding arrangement, as shown in FIG. 4 and outlined above, is carried throughout the keyboard and enables an operator skilled in the operation of a standard typewriter to quickly and easily locate any desired one-cell contraction by merely directing his attention to the character key which bears the initial letter of the one-cell contraction desired and then letting the color code direct his eye to all the keys bearing contractions which begin with the appropriate letter.

The logical and orderly arrangement of the one-cell contractions has been carried forth throughout the keyboard of the present invention, as has the color coding scheme, to make generation of Braille copy by an operator skilled in the operation of an ordinary typewrite as easy as possible. For instance, the "w" key 10 and the keys bearing one-cell contractions which begin with "w" are grouped conveniently with respect to each other and they are differentiated from the "e" key 16 and the keys bearing one-cell contractions beginning with "e" by the green background of the former and the red background of the latter. The "w" key 10 is also differentiated from the "s" key 9, and the conveniently arranged keys bearing one-cell contractions beginning with "s" and from the "a" key 8 and its associated one-cell contraction keys because the backgrounds for "s" and "a" are blue and red, respectively. Thus, an operator of the present keyboard, who knows the location of the single character keys due to his knowledge of the keyboard of an ordinary typewriter, will be able to quickly and easily locate any of the one-cell contractions of Grade II Braille.

It will be noted, by reference to FIG. 4, that a given color may be used to identify one-cell contractions beginning with different initial letters in widely separated areas of the keyboard. For example, the keytops for the one-cell contractions "which," "were," "was," which are grouped with the keytop for their initial letter "w," are represented as being colored green. The keytops for the contractions "com," "con," and their initial letter "c" are green, as are also the keytops for the contractions "out," "ow" and their initial letter "o." A trained typist will find the keytops for the different letters, such as "w," "c" and "o" instinctively, and will then be able to locate the contraction keytops through the related color coding. Thus, no confusion should arise as a result of the use of a particular color in different areas of the keyboard, although it will be understood that duplication could, if desired, be avoided through the use of different, non-duplicated colors, and if necessary, shade variations thereof.

In addition to the logical and orderly arrangement of the letters and the one-cell contraction keys, the keys bearing the numbers and bearing punctuation marks are also logically and conveniently grouped according to their grouping on the keyboard of a standard typewriter. Furthermore, the keys bearing special characters are conveniently and logically grouped at the right-hand end of the keyboard as seen in FIG. 1 and are color coded with the color red. Thus, an operator desiring to generate a special character may quickly and easily locate the correct key.

As has been pointed out above, all the one-cell contractions of the Grade II Braille language are represented on the keytops of the keyboard of the present invention and may be generated without knowledge on the part of the operator as to what the Braille configuration of the one-cell contraction is. All the two-cell contractions are listed on the keyboard of the present invention in a chart which is shown in FIG. 2 and which normally appears to the left of the keytops of FIG. 1. As has been pointed out hereinbefore, the two-cell contractions are generated by the generation of an intelligence bearing Braille cell in conjunction with the generation of a special character. For instance, the word "many" is generated by depressing the key 18 which generates a Braille cell containing dots in the 4, 5 and 6 positions and by following this special character cell with a cell containing dots representative of the letter "m." Various suffixes may also be generated in the manner described above. For instance, the suffix "ness" may be generated by depressing the special character key 19, which generates a cell having dots in the 4 and 6 positions, followed by a cell which represents the letter "s."

On the chart shown in FIG. 2, it may be seen that two of the columns 27 and 28 of the two-cell contractions are labeled "initial letter" and one of the columns 29 is labeled "final letter." It should be understood that "initial letter" and "final letter" indicate the letter to be used in conjunction with the special key to generate the two-cell contraction. For instance, the word "part" appears in initial column 27 and it is seen that the letter to be used in conjunction with the special character, that is, "p," is the first letter of the word to be represented by the two-cell contraction; whereas the suffix "sion" appears in final letter column 29 and the final letter of this suffix, that is, "n," is the letter to be used with the special character to generate the two-cell contraction for this suffix.

The chart which is shown in FIG. 3 normally appears at the right of the keytops on FIG. 1. This chart is used to aid an operator in generation of special punctuation signs. For instance, the chart carries instructions on the generation of both the dash and the long dash. These punctuation signs are generated by repeating the depression of the hyphen key 17. As the instructions indicate, when it is desired to generate the character for a dash, the hyphen key 17 must be depressed once and the depression must be repeated once. That is the symbol for hyphen must appear twice. When it is desired to generate the symbol for a long dash the hyphen key must be depressed once and this depression must be repeated three times. That is the symbol for hyphen must appear four times.

When it is desired to generate the symbol for a bracket, the chart indicates that the symbol for parentheses must be preceded by the special character which has a dot in the sixth position only to generate a left-hand bracket and must be followed by the special character which has a dot in the third position only to generate a right-hand bracket. It is believed that the remaining instructions for generating special punctuation signs are self-explanatory when taken in conjunction with the explanation of the generation of the four characters outlined above. It should be noted, however, that all of the instructions given in the chart of FIG. 3 are connected to the appropriate key by the use of lines. Thus, when an operator desires to generate any of the punctuation marks which are listed in the chart of FIG. 3, he will be able to do so because the lines of the chart will quickly direct his attention to the appropriate key for carrying out the instruction. It will be apparent that the instructions listed in the chart on FIG. 3 are for punctuation signs which are seldom used.

It will be noted that no chart of instructions is given for the generation of the short form words. There are only 76 of these words and since they appear quite often and their form is very logical and orderly, an operator can quickly and easily learn to generate the short form words from memory. It would, therefore, be wasteful to permanently attach a chart or instruction sheet to the keyboard. Since none of the short form words are contained in a single cell and since they are not generated by the use of a single cell in conjunction with a special character, it is not possible to have a single key for the generation of a short form word, nor is it possible to arrange a chart, such as the one shown in FIG. 2, wherein all the short form words and instructions for their generation can be logically arranged. Therefore, an operator of the keyboard of the present invention should memorize the various short form words and should thereafter incorporate from memory the short form words into any Braille copy to be generated. As has been pointed out above the short form words are very common in nature and follow a very orderly and logical pattern and therefore memorization of the short form words proceeds very quickly and easily.

The operation of the keyboard of the present invention when generating Grade I Braille, is identical to the operation of a standard typewriter keyboard with the exception that it is necessary to depress an appropriate key when it is desired to generate either numbers or capitals. Since the operation of an ordinary typewriter keyboard is rather well known, this is not described in detail herein.

Operation of the keyboard of the present invention when generating Grade II Braille proceeds from a knowledge of the operation of an ordinary typewriter keyboard. As has been herein described the logical arrangement and color coding of the one-cell contractions allow an operator skilled in the operation of an ordinary typewriter keyboard to generate them without knowledge of Braille. The charts which are shown in FIGS. 2 and 3 and which normally appear at the left and right, respectively, of the keytops of FIG. 1 allow the operator to quickly and easily generate the two-cell contractions and the special punctuation signs. All that need be done to generate the appropriate Braille cells for the two-cell contractions and special punction signs is to refer to the appropriate chart and then proceed as the chart directs. Since the special characters necessary to generate two-cell contractions are logically and conveniently grouped and color coded, and since the lines of the chart shown in FIG. 3 direct the attention of the operator to the appropriate keytop for carrying out the instructions of the chart, it is apparent that the keyboard of the present invention enables an operator, skilled in the operation of an ordinary typewriter, to quickly and easily generate all the letters and various shorthand forms of Grade II Braille. The operator need only memorize the short form words to become skilled and efficient in the generation of Grade II Braille copy.

Although only one embodiment of the invention is shown in the drawings and described in the foregoing specification, it will be understood that the invention is not limited to the specific embodiment described, but is capable of modification and rearrangement and substitute of parts and elements without departing from the spirit of the invention.

What is claimed is:
1. In a keyboard for generating Braille copy,
a key having a keytop bearing on a portion of its surface a group of letters which form a contraction in the Braille language and bearing on another portion of its surface a word, the contraction and the word beginning with the same letter,
at least one other key having a keytop bearing on a portion of its surface a second contraction in the Braille language which begins with the same letter as the first contraction and bearing on another portion a second word, the second word not beginning with the same letter as the first word, and a third key having a keytop bearing on at least a portion of its surface a third contraction of the Braille language which begins with the same letter as the first letter of the second word.

2. A keyboard for generating Braille copy including,
a plurality of keys, certain of said keys having keytops arranged in contiguous groups, each of the groups having a keytop which bears on a portion of its surface a representation of an alphabetic character followed by a representation of a group of letters, the character and the letters forming a word, said keytop bearing on the remainder of its surface a representation of a group of letters which begin with said character and which form a contraction in the Braille language, each group also having at least one other keytop which bears on at least a portion of its surface a representation of a group of letters which form a second contraction in the Braille language, the second contraction having said character for its first letter, and
a color coding applied to said keytops for separating the groups whereby the color of any one group is different from the color of any adjacent group.

3. A keyboard including,
a plurality of keys each key having a keytop for actuation to control the generation of characters,
a case shift key to modify the effect of operation of said plurality of keys,
one plurality of keys having keytops each of which keytops has on a portion of its surface a representation of a first contraction in the Braille language and having on another portion of its surface a representation of a different contraction in the Braille language which begins with the same letter as the first contraction, the first-mentioned contraction for generation when the case shift key is not operated and the last-mentioned contraction for generation when the case shift key is operated,
a second plurality of keys having keytops for controlling the generation of letters of the alphabet, figures, punctuation signs, contractions of the Braille language, and special characters necessary in the generation of Braille copy, the second plurality of keytops being distinguished from the first plurality of keytops in that each keytop of the second plurality bears not more than one contraction in the Braille language, and
a third plurality of keys having keytops, each keytop having on a portion of its surface a representation of a first contraction in the Braille language and having on another portion of its surface a representation of a different contraction in the Braille language which begins with a different letter than the first contraction, the first-mentioned contraction being generated when the case shift key is not operated and the different contraction being generated when the case shift key is operated.

4. In a keyboard for composing text material to be represented by Braille cells which cells may represent an alphabetic character, a numeric character, a punctuation mark or a function,
a set of keys arranged in the format of an ordinary typewriter and having keytops bearing indicia on their lower halves representative of the alphabetic characters in said format,
one plurality of said keys bearing indicia of Braille contractions in addition to the alphabetic and numeric characters,
a second set of keys having keytops at least one of which bears only indicia of Braille contractions, each of the keys of said one plurality and of said second set which bear contractions beginning with a given letter being in juxtaposed relationship with the key of said set of keys bearing said given letter and with each other,
a shift key to modify the effect of operation of said sets of keys and located in the same relative position with respect to said first-mentioned set of keys as the shift key of an ordinary typewriter is to its keys, and
some of said second set of keys also bearing indicia indicative of other Braille contractions representative of cells to be generated upon operation of said shift key.

5. In a keyboard for composing text material to be represented by Braille cells which cells may represent an alphabetic character, a numeric character, a punctuation mark or a function,
a set of keys arranged in the format of an ordinary typewriter and having keytops bearing indicia representative of the alphabetic characters and numeric characters in said format,
one plurality of said keys having keytops bearing indicia of Braille contractions in addition to the alphabetic and numeric characters,
a second set of keys having keytops bearing only indicia of Braille contractions,
some of said one plurality and said second set being color coded in groups to indicate a juxtaposed relationship of all of the contractions starting with a given character to the keytop bearing indicia of that particular character,
a shift key to modify the effect of operation of said sets of keys and located in the same relative position with respect to said first-mentioned set of keys as the shift key of an ordinary typewriter is to its keys, and
some of said second set of keys also bearing indicia indicative of other Braille contractions representative of cells to be generated upon operation of said shift key.

References Cited by the Examiner

UNITED STATES PATENTS

| | | | |
|---|---|---|---|
| 706,002 | 8/1902 | Allen | 197—100 |
| 886,149 | 4/1908 | McCool | 197—100 |
| 1,319,687 | 10/1919 | Bates | 197—100 |
| 2,318,519 | 5/1943 | Palanque | 197—100 |
| 2,680,507 | 6/1954 | Frey et al. | 197—6.1 |

FOREIGN PATENTS 365,928   1/1932   Great Britain.

ROBERT E. PULFREY, *Primary Examiner.*